(12) United States Patent
Hedman et al.

(10) Patent No.: US 12,031,615 B2
(45) Date of Patent: Jul. 9, 2024

(54) TRANSMISSION, A POWERTRAIN AND A VEHICLE

(71) Applicant: VOLVO TRUCK CORPORATION, Gothenburg (SE)

(72) Inventors: Anders Hedman, Marstrand (SE); Johan Folkesson, Skene (SE); Sven Norberg, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/107,598

(22) Filed: Feb. 9, 2023

(65) Prior Publication Data

US 2023/0313865 A1 Oct. 5, 2023

(30) Foreign Application Priority Data

Mar. 29, 2022 (EP) .................................... 22164981

(51) Int. Cl.
*F16H 3/00* (2006.01)
*F16H 3/46* (2006.01)

(52) U.S. Cl.
CPC ............... *F16H 3/006* (2013.01); *F16H 3/46* (2013.01); *F16H 2200/0004* (2013.01); *F16H 2200/0021* (2013.01)

(58) Field of Classification Search
CPC ............ F16H 3/006; F16H 3/091; F16H 3/16; F16H 3/724; F16H 2003/0815; F16H 37/065; F16H 2200/0021
See application file for complete search history.

(56) References Cited

U.S. PATENT DOCUMENTS

2017/0190246 A1* 7/2017 Venturi .................. B60K 6/547

FOREIGN PATENT DOCUMENTS

| DE | 102012000657 A1 | 7/2013 |
| EP | 3171053 A1 | 5/2017 |
| WO | 2021073748 A1 | 4/2021 |
| WO | 2021089128 A1 | 5/2021 |

OTHER PUBLICATIONS

Extended European Search Report for European Patent Application No. 22164981.7, mailed Sep. 14, 2022, 8 pages.

\* cited by examiner

*Primary Examiner* — Bobby Rushing, Jr.
(74) *Attorney, Agent, or Firm* — Sage Patent Group

(57) ABSTRACT

A transmission for a vehicle includes a first input shaft, a second input shaft, a countershaft, a main shaft, and an output shaft, a first gear plane including a first input shaft gearwheel, a first main gearwheel, and a first countershaft gearwheel, and a second gear plane including a second input shaft gearwheel, a second main gearwheel, a second countershaft gearwheel, a first gear engaging device, a second gear engaging device, wherein the output shaft is drivingly connectable to the main shaft, and wherein the transmission is configured to only enable transfer of torque between the first input shaft and the output shaft via the main shaft, and to only enable transfer of torque between the second input shaft and the output shaft via the main shaft.

15 Claims, 11 Drawing Sheets

TRANSMISSION, A POWERTRAIN AND A VEHICLE

CROSS-REFERENCE TO RELATED APPLICATION

This application claims foreign priority to European Application No. 22164981.7 filed on Mar. 29, 2022, the disclosure and content of which is incorporated by reference herein in its entirety.

TECHNICAL FIELD

The disclosure relates to a transmission, a powertrain and a vehicle.

The disclosure can be applied in heavy-duty vehicles, such as trucks, buses, and construction equipment. Although the disclosure will be described with respect to a truck, the disclosure is not restricted to this type of vehicle, but may also be used in other vehicles such as buses, trailers, wheel loaders, excavators, etc.

BACKGROUND

Electrically or partly electrically operated heavy-duty vehicles are becoming increasingly common. For heavy-duty vehicles, it may be desirable to provide more than one electric machine for propulsion of the vehicle, and also to provide electric power to auxiliary systems and for power take-off. In such powertrains including two propulsion units, a common transmission may be provided, transmitting torque from each one of the electric machines to a common output shaft used to propel a driven axle of the vehicle.

There is an ongoing strive to improve the powertrains of electrically operated vehicles and combine powertrain efficiency with a broad power range.

SUMMARY

A primary object of the disclosure is to provide an in at least some aspect improved transmission suitable for a powertrain comprising two power units, such as two electric machines.

According to a first aspect of the disclosure, the above object is achieved by a transmission for a vehicle according to claim 1. The transmission comprises:
  a first input shaft, a second input shaft, a countershaft, a main shaft, and an output shaft,
  a first gear plane comprising a first input shaft gearwheel arranged on the first input shaft, a first main gearwheel rotatably arranged on the main shaft, and a first countershaft gearwheel arranged on the countershaft, the gearwheels of the first gear plane being arranged in mutual driving connection,
  a second gear plane comprising a second input shaft gearwheel arranged on the second input shaft, a second main gearwheel rotatably arranged on the main shaft, and a second countershaft gearwheel arranged on the countershaft, the first countershaft gearwheel being selectively drivingly connectable to the second countershaft gearwheel, the gearwheels of the second gear plane being arranged in mutual driving connection,
  a first gear engaging device selectively settable to one of:
    a neutral state, and
    a single engaged state, in which it drivingly connects the first main gearwheel to the main shaft,
  a second gear engaging device selectively settable to one of:
    a neutral state, and
    a single engaged state, in which it drivingly connects the second main gearwheel to the main shaft,
  wherein the output shaft is drivingly connectable to the main shaft, and wherein the transmission is configured to only enable transfer of torque between the first input shaft and
  the output shaft via the main shaft, and to only enable transfer of torque between the second input shaft and the output shaft via the main shaft.

Hence, the transmission does not provide any possibility for bypassing the main shaft when transferring torque between the input shafts and the output shaft. Instead, all torque transfer between the respective input shafts and the output shaft must take place via the main shaft. A compact and robust transmission is thereby achieved.

By means of the two input shafts, the transmission can be used to transmit torque from two different power units to the driven wheels of a vehicle, either from one power source at a time or from both power sources simultaneously. The transmission disclosed herein is able to provide uninterrupted torque transfer at four different gear ratios using the two gear planes. Since the transmission comprises two separate gear planes, and selectively drivingly connectable countershaft gearwheels, reduced gear mesh loads can be achieved.

The gearwheels of each gearwheel plane are arranged in mutual driving connection, such as by the input shaft gearwheels being in meshing engagement with the respective main gearwheels, in turn being in meshing engagement with the respective countershaft gearwheel. It may also be possible to provide an intermediate shaft with gearwheels via which the driving connection is achieved by meshing engagement.

The first countershaft gearwheel is selectively drivingly connectable to the second countershaft gearwheel, such as by selectively rotationally connecting the second countershaft gearwheel to the countershaft. In this case, the first countershaft gearwheel may be permanently fixed for common rotation with the countershaft, while the second countershaft gearwheel is rotatably arranged on the countershaft and is selectively rotationally connectable therewith by means of a third gear engaging device.

By the term "rotationally connect to" is intended "connect for common rotation with". For example, in the engaged state of the first gear engaging device, the first gear engaging device connects the first main gearwheel for common rotation with the main shaft around a common axis of rotation.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved, e.g., by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel,
  which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

By a meshing engagement is intended a permanent meshing engagement if nothing else is mentioned.

Optionally, the first main gearwheel is arranged in meshing engagement with each one of the first input shaft gearwheel and the first countershaft gearwheel. The second main gearwheel may similarly be arranged in meshing engagement with each one of the second input shaft gearwheel and the second countershaft gearwheel. In this way, a compact configuration with no additional shaft and thereby reduced frictional losses may be achieved.

Optionally, the first countershaft gearwheel is permanently fixed for common rotation with the countershaft, and the second countershaft gearwheel is rotatably arranged on the countershaft. In this case, the transmission may further comprise a third gear engaging device for selectively rotationally connecting the second countershaft gearwheel to the countershaft, thereby selectively drivingly connecting the first countershaft gearwheel to the second countershaft gearwheel. This is particularly useful when the second countershaft gearwheel has a larger diameter than the first countershaft gearwheel. Of course, it would alternatively be possible to selectively rotationally connect the first countershaft gearwheel to the countershaft, the second countershaft gearwheel being permanently fixed to the countershaft. In particular, this alternative configuration would be useful when the first countershaft gearwheel has a larger diameter than the second countershaft gearwheel.

Optionally, the second gear plane further comprises a first input shaft second gearwheel rotatably arranged on the first input shaft, and the transmission further comprises a fourth gear engaging device for selectively rotationally connecting the first input shaft second gearwheel to the first input shaft. The first input shaft second gearwheel may herein be arranged in meshing engagement with the second main gearwheel. With the additional first input shaft second gearwheel, efficiency losses can be reduced. This is particularly useful for high-speed operation of the vehicle, wherein torque may be transmitted from both power units to the main shaft via the second gear plane.

Optionally, the third gear engaging device and the fourth gear engaging device are arranged for common operation by a single actuator.

Optionally, the third gear engaging device is configured to rotationally connect the second countershaft gearwheel to the countershaft only when the fourth gear engaging device rotationally disconnects the first input shaft second gearwheel from the first input shaft, and vice versa. A neutral state in which both gearwheels are rotationally disconnected may also be available. The actuator may thus be movable between three different positions.

Optionally, the first input shaft gearwheel and the first main gearwheel of the first gear plane provide a larger gear ratio than the second input shaft gearwheel and the second main gearwheel of the second gear plane. However, the opposite configuration is also possible. The gear ratio in the first gear plane is herein the rotational speed of the first input shaft gearwheel divided by the rotational speed of the first main gearwheel. Correspondingly, the gear ratio in the second gear plane is the rotational speed of the second input shaft gearwheel divided by the rotational speed of the second main gearwheel.

Optionally, the first input shaft gearwheel is permanently fixed for common rotation with the first input shaft, and the second input shaft gearwheel is permanently fixed for common rotation with the second input shaft. This improves the robustness of the transmission since no clutch or similar is necessary for fixing the first and/or the second gearwheel/s to the respective input shaft/s.

Optionally, the transmission further comprises a range gear configured for transfer of torque between the main shaft and the output shaft at a high range gear and a low range gear, respectively. Thus, the main shaft is drivingly connectable to the output shaft via the range gear.

Optionally, the range gear comprises a planetary gear set, i.e., a gear set comprising range gear components in the form of a ring gearwheel, a planetary gearwheel carrier carrying a plurality of planetary gearwheels, and a sun gearwheel. A compact configuration of the transmission can thereby be achieved.

Optionally, the transmission further comprises a range gear selector configured to set the range gear to the low range gear by locking one of the range gear components, such as the ring gearwheel, to a transmission housing, and to set the range gear to the high range gear by rotationally connecting at least two of the range gear components. Thus, in the low range gear, the range gear components are allowed to rotate relative one another. In the high range gear, the range gear components are allowed to rotate with respect to the housing, but not relative one another. The main shaft may in a space efficient configuration be connected to the sun gearwheel, and the planetary gear carrier may be connected to the output shaft, although any other configuration is also possible.

According to a second aspect of the disclosure, at least the primary object is also achieved by a powertrain according to claim 13. The powertrain comprises a first power unit, a second power unit and the transmission according to the first aspect of the disclosure, wherein the first input shaft of the transmission is drivingly connected to the first power unit and wherein the second input shaft of the transmission is drivingly connected to the second power unit. Advantages and advantageous features of the powertrain according to the disclosure appear from the above description of the first aspect of the disclosure.

Optionally, at least one of the first power unit and the second power unit is an electric machine. Both power units may be electric machines of the same type or of different types. At least one of the power units may alternatively be an internal combustion engine.

Optionally, the powertrain further comprises a power take-off, PTO, device drivingly connected or connectable to the countershaft. The PTO device may herein be driven independently of the vehicle speed since power from the second power unit can be used for propulsion of the vehicle while power from the first power unit is used for driving the PTO device. This may be achieved by setting the first gear engaging device to the neutral state, and the second gear engaging device to the engaged state, and the third gear engaging device to a disengaged state in which the countershaft gearwheels are not drivingly connected.

The PTO device may comprise a selectively engageable clutch for drivingly connecting the PTO device to the countershaft. By means of the clutch, it is possible to disconnect the PTO device from the countershaft and thereby use torque from both of the power units for driving the propeller shaft without driving the PTO device.

Optionally, the clutch is a tooth clutch. When the vehicle is in motion and propelled solely by the second power unit, the tooth clutch can be engaged by controlling the first power unit to a low or zero rotational speed.

According to a third aspect of the disclosure, at least the primary object is also achieved by a vehicle comprising a powertrain according to the second aspect. The vehicle may for example be a fully electrified vehicle, or a hybrid vehicle comprising also at least one internal combustion engine in addition to the first and second electric machines. Advantages and advantageous features of the vehicle according to the disclosure appear from the above description of the first and second aspects of the disclosure.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

Figure 1:
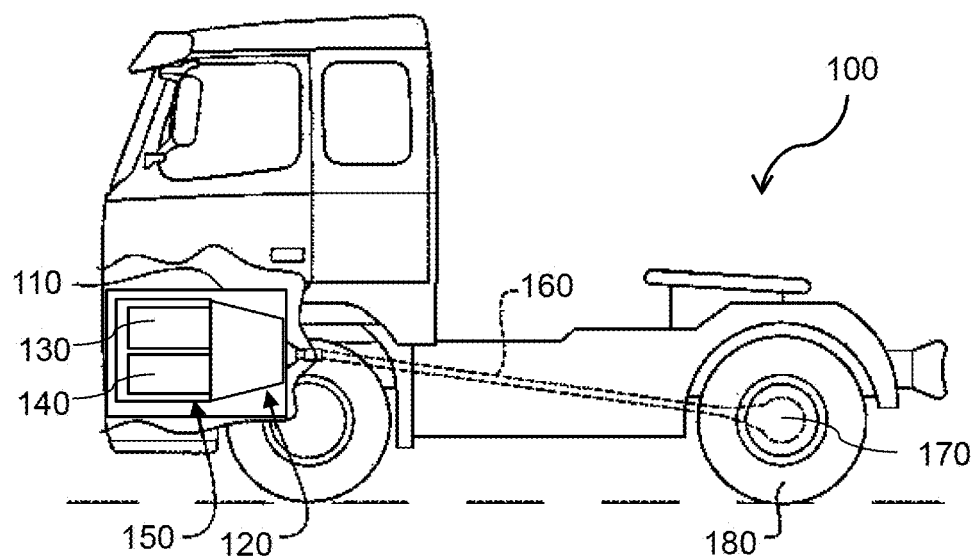
FIG. 1 schematically illustrates a vehicle according to an embodiment of the disclosure, FIG. 2 schematically illustrates a transmission according to a first embodiment of the disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION OF EXAMPLE EMBODIMENTS OF THE DISCLOSURE

A vehicle 100 in the form of a truck according to an embodiment of the disclosure is schematically shown in FIG. 1. The vehicle 100 includes a powertrain 110 with a power unit assembly 150 for propulsion of the vehicle 100. The power unit assembly 150 comprises at least two power units 130, 140 in the form of electric machines 130, 140 connected to a transmission 120 and configured to be powered by an electric energy storage system (not shown) of the vehicle 100. The transmission 120 is arranged to transfer torque from the power unit assembly 150 to a propeller shaft 160 connecting the transmission 120 to a driven axle 170 that drives driven wheels 180 of the vehicle 100. The vehicle may further comprise a power take-off, PTO, device (not shown).

Thus, in the shown embodiment, the vehicle 100 is a fully electrified vehicle configured to be driven solely by the power unit assembly 150. The vehicle 100 may be arranged with more than one driven axle, such as two or more driven axles. The power unit assembly 150 of the vehicle 100 may comprise more than two electric machines, such as three or four electric machines. The vehicle may also be a hybrid vehicle, provided with an internal combustion engine in addition to the electric machines 130, 140. The electric machines 130, 140 may be in the form of electric motors/generators.

Of course, the vehicle and the powertrain may have many different configurations. By way of example, the electric machine assembly 150 and the transmission 120 do not need to be provided at a front of the vehicle, but may, e.g., be combined with a rear axle of the vehicle.

Figure 2:
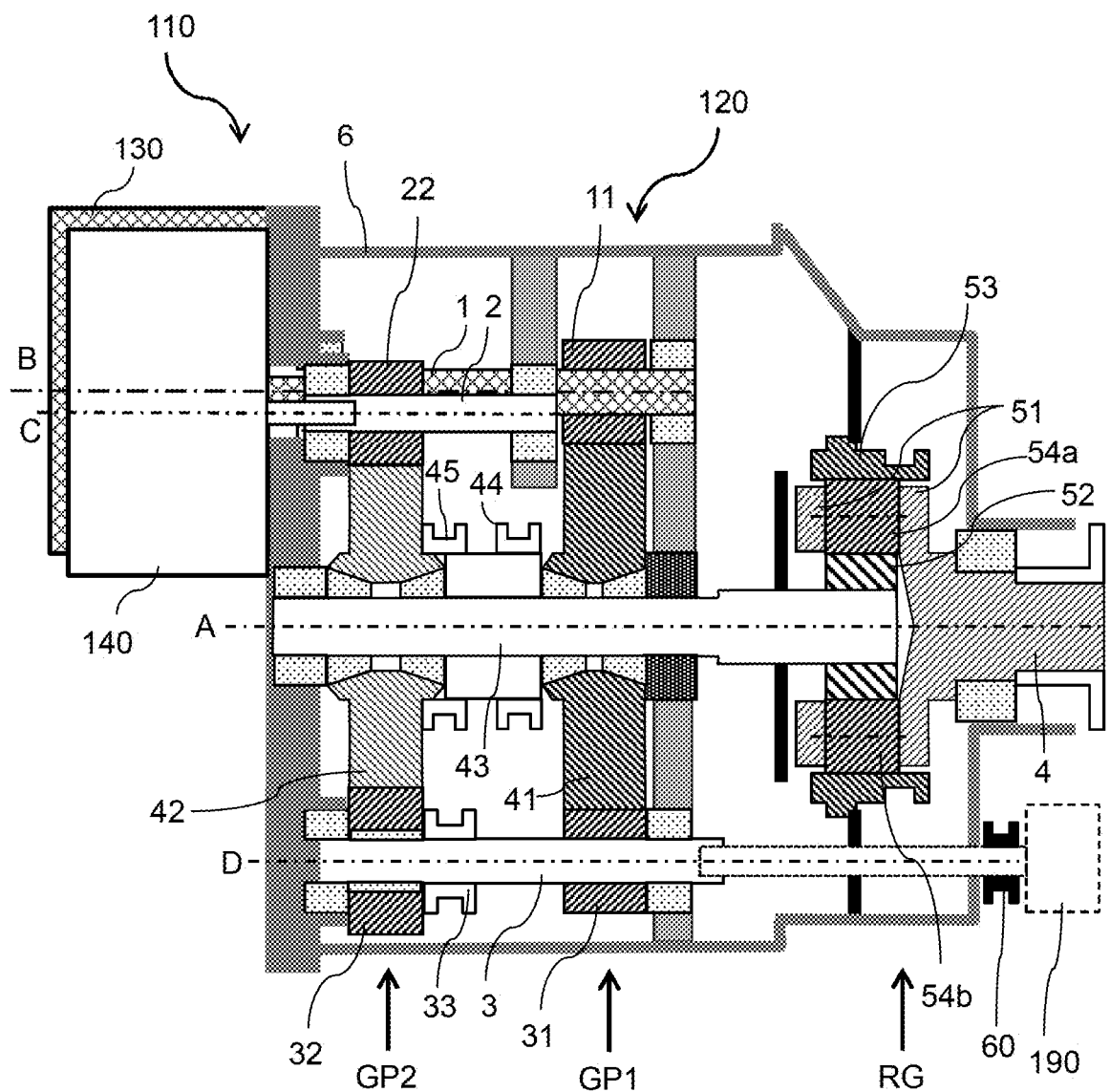

FIG. 2 illustrates parts of a powertrain 110 including a transmission 120 according to a first embodiment of the disclosure. The powertrain 110 further comprises a first electric machine 130, a second electric machine 140, and an optional PTO device 190. The transmission 120 comprises a first input shaft 1 drivingly connected to the first electric machine 130 and a second input shaft 2 drivingly connected to the second electric machine 140. The transmission 120 further comprises an output shaft 4 configured to be drivingly connected to the propeller shaft 160 of the vehicle 100, a main shaft 43, and a countershaft 3, which is herein drivingly connectable to the PTO device 190 via a clutch 60. The shafts 1, 2, 3, 4, 43 are mounted to a transmission housing 6 using bearings, shown as dotted areas in the figures. The shafts 1, 2, 3, 4, 43 are herein parallel shafts, with the output shaft 4 and the main shaft 43 extending along a longitudinal axis A. The first input shaft 1 extends along a longitudinal axis B, the second input shaft 2 extends along a longitudinal axis C, and the countershaft 3 extends along a longitudinal axis D. When viewed from a viewpoint located along, e.g., the axis A, the axes A, B, and C will in the illustrated embodiment form the corners of an assumed triangle, although this is not necessary. The electric machines, and consequently also the input shafts, may in some embodiments alternatively be coaxially arranged. The axes A, B and C may also extend in a common plane, offset from one another.

A first gear plane GP1 of the transmission 120 comprises a first input shaft gearwheel 11 arranged on the first input shaft 1, a first main gearwheel 41 rotatably arranged on the main shaft 43, and a first countershaft gearwheel 31 arranged on the countershaft 3. Bearings, shown as dotted areas in the figures, are provided between the first main gearwheel 41 and the main shaft 43. The gearwheels 11, 31, 41 of the first gearwheel plane GP1 are arranged in mutual driving connection, namely by the first main gearwheel 41 being arranged in meshing engagement with each one of the first input shaft gearwheel 11 and the first countershaft gearwheel 31. The first input shaft gearwheel 11 is herein permanently fixed for common rotation with the first input shaft 1 and the first countershaft gearwheel 31 is permanently fixed for common rotation with the countershaft 31. The first gear plane GP1 extends perpendicularly to the axes A, B, C, D.

A second gear plane GP2 comprises a second input shaft gearwheel 22 arranged on the second input shaft 2, a second main gearwheel 42 rotatably arranged on the main shaft 43, and a second countershaft gearwheel 32 rotatably arranged on the countershaft 3. Bearings, shown as dotted areas in the figures, are provided between the second main gearwheel 42 and the main shaft 43, as well as between the second countershaft gearwheel 32 and the countershaft 3. The first countershaft gearwheel 31 is selectively drivingly connectable to the second countershaft gearwheel 32 by means of a third gear engaging device 33. The third gear engaging device 33 is for this purpose arranged to selectively fix the second countershaft gearwheel 32 for common rotation with the countershaft 3 in an engaged state of the third gear engaging device 33. In a disengaged state of the third gear engaging device 33, the second countershaft gearwheel 32 is rotatable with respect to the countershaft 3. The gearwheels 22, 32, 42 of the second gearwheel plane GP2 are arranged in mutual driving connection, namely by the second main gearwheel 42 being arranged in meshing engagement with each one of the second input shaft gearwheel 22 and the second countershaft gearwheel 32. The second input shaft gearwheel 22 is herein permanently fixed for common rotation with the second input shaft 2. The second gear plane GP2 extends perpendicularly to the axes A, B, C, D.

A first gear engaging device 44 of the transmission 120 is provided. The first gear engaging device 44 herein comprises a first sleeve member 44 that may be actuated by means of an actuator (not shown). The first gear engaging device 44 is selectively settable to one of:
  a neutral state, in which the first gear engaging device 44 allows the first main gearwheel 41 to rotate with respect to the main shaft 43, and
  a single engaged state, in which it drivingly connects the first main gearwheel 41 to the main shaft 43.

A second gear engaging device 45 is further provided. The second gear engaging device 45 herein comprises a second sleeve member 45 that may be actuated by means of an actuator (not shown). The second gear engaging device 45 is selectively settable to one of:
  a neutral state, in which the second gear engaging device 45 allows the second main gearwheel 42 to rotate with respect to the main shaft 43, and
  a single engaged state, in which it drivingly connects the second main gearwheel 42 to the main shaft 43.

The output shaft 4 is drivingly connectable to the main shaft 43, and the transmission 120 is configured to only enable transfer of torque between the first input shaft 1 and the output shaft 4 via the main shaft 43. The transmission 120 is further configured to only enable transfer of torque between the second input shaft 2 and the output shaft 4 via the main shaft 43. In other words, all torque transfer between each one of the input shafts 1, 2 and the output shaft 4 must take place via the main shaft 43.

The sleeve members 44, 45 may, e.g., be referred to as clutch sleeves, clutch collars, engaging sleeves, or similar. Shift forks (not shown) may be provided for moving the sleeve members 44, 45 so as to change gears. Gear shifting may be controlled from a transmission control unit (not shown) using, e.g., electric, hydraulic, or pneumatic actuators to move the shift forks.

A range gear RG is further provided for drivingly connecting the output shaft 4 to the main shaft 43. The range gear RG is selectively settable to a high range gear or a low range gear. The range gear RG comprises at least a first, a second and a third range gear component 51, 52, 53. In the present embodiment, the range gear RG comprises a planetary gear set, the first range gear component 51 being a planetary gearwheel carrier 51 carrying a plurality of planetary gearwheels 54a, 54b. The second range gear component 52 is a sun gearwheel 52, and the third range gear component 53 is a ring gearwheel 53. The sun gearwheel 52 is fixed for common rotation with the main shaft 43, and the planetary gearwheel carrier 51 is fixed for common rotation with the output shaft 4. In other embodiments, an ordinary, non-planetary gear arrangement may be used as the range gear.

The range gear RG is settable to the low range gear by locking the ring gearwheel 53 to the transmission housing 6. It is further settable to the high range gear by rotationally connecting at least two of the first, second and third range gear components 51, 52, 53, thereby allowing the range gear components 51, 52, 53 to rotate with respect to the transmission housing 6, but not relative one another. Any two of the first, second and third range gear components 51, 52, 53 may be rotationally connected for this purpose, but in the shown embodiment, this is achieved by moving the ring gearwheel 53 to the left, thereby releasing it from the transmission housing 6 and fixing it to the main shaft 43, in turn fixed to the sun gearwheel 52. A range gear selector (not shown) is provided for this purpose.

The transmission 120 is herein arranged so that the first input shaft gearwheel 11 and the first main gearwheel 41 of the first gear plane GP1 provide a larger gear ratio than the second input shaft gearwheel 22 and the second main gearwheel 42 of the second gear plane GP2. Furthermore, the second countershaft gearwheel 32 has a larger diameter than
  the first countershaft gearwheel 31, and the first main gearwheel 41 has a larger diameter than the second main gearwheel 42. The different diameters are indicative of different number of teeth on the respective gearwheels. The second gear plane GP2 is in the shown embodiment arranged closer to the electric machines 130, 140 than the first gear plane GP1, which is located closer to the range gear RG. However, in other embodiments, the
  first gear plane may be closer to the electric machines 130, 140 and further from the range gear RG than the second gear plane is.

FIGS. 3-9 illustrate the power flows in a gear shifting sequence using the transmission 120 according to the first embodiment for starting and accelerating a vehicle 100. The power
  flows are illustrated as dotted/dashed/dash-dotted arrows in the figures.

Figure 3:
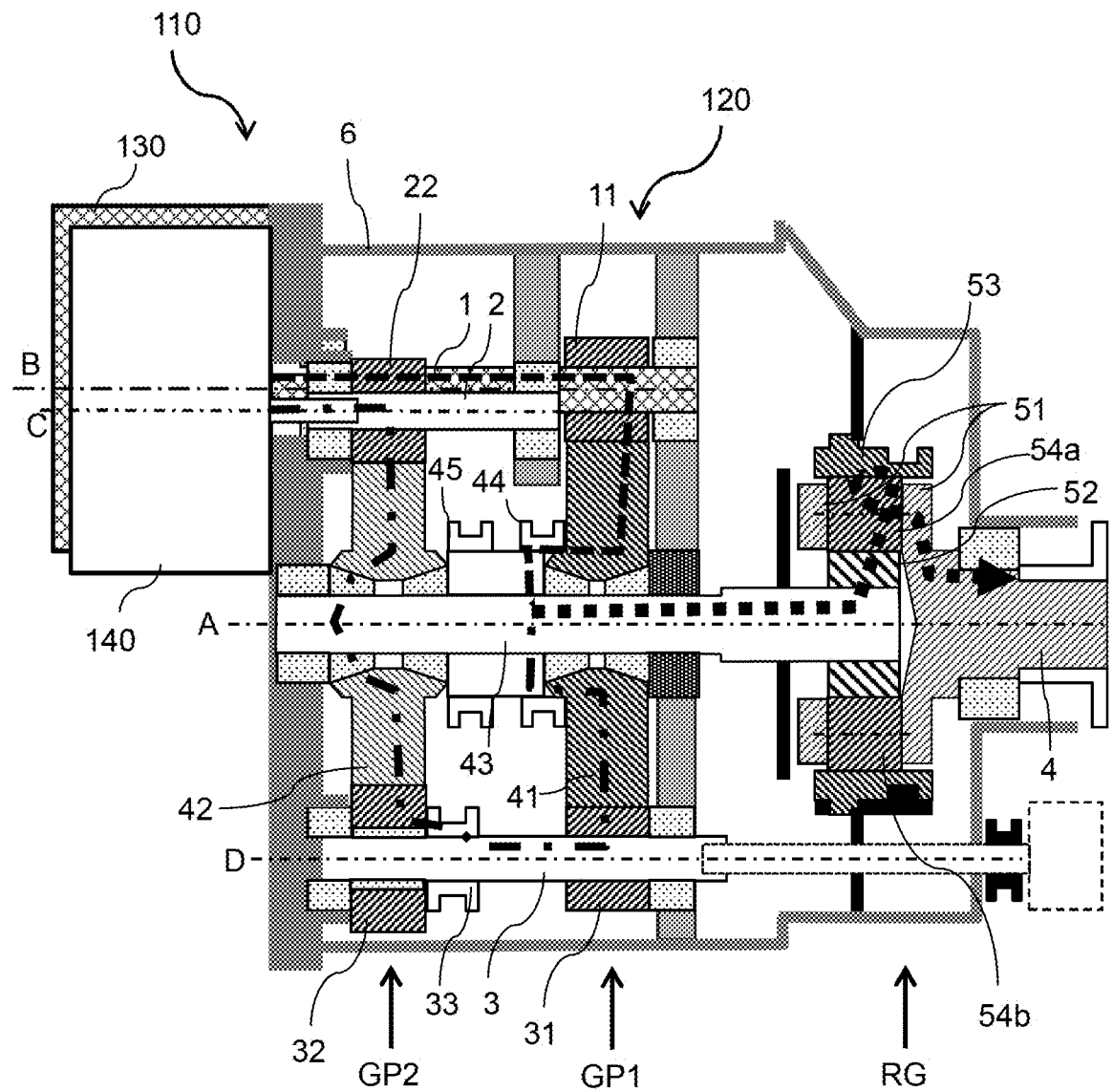
FIG. 3 illustrates power flow through the transmission in FIG. 2 in a first state.

In FIG. 3, the transmission 120 is in a starting configuration with the first gear engaging device 44 set to its engaged state and the second gear engaging device 45 set to its neutral state. The third gear engaging device 33 is set to its engaged state, connecting the second countershaft gearwheel 32 for common rotation with the countershaft 3. Thereby, the first electric machine 130 is drivingly connected to the main shaft 43 via the first input shaft gearwheel 11, the first main gearwheel 41 and the first gear engaging device 44. The second electric machine 140 is drivingly connected to the main shaft 43 via the gearwheels 22, 42, 32 of the second gear plane GP2, the third gear engaging device 33, the countershaft 3, the first countershaft gearwheel 31, the first main gearwheel 41 and the first gear engaging device 44. Both electric machines 130, 140 may thus be used for propulsion of the vehicle 100 at low vehicle speeds, but with different gear meshes used for torque transmission from the respective electric machines 130, 140, contributing to reduced gear mesh loads. The range gear RG is set to the low range gear, i.e., the ring gearwheel 53 is locked to the transmission housing 6. Torque is thereby transmitted from the main shaft 43 to the output shaft 4 via the low range gear.

Figure 4:
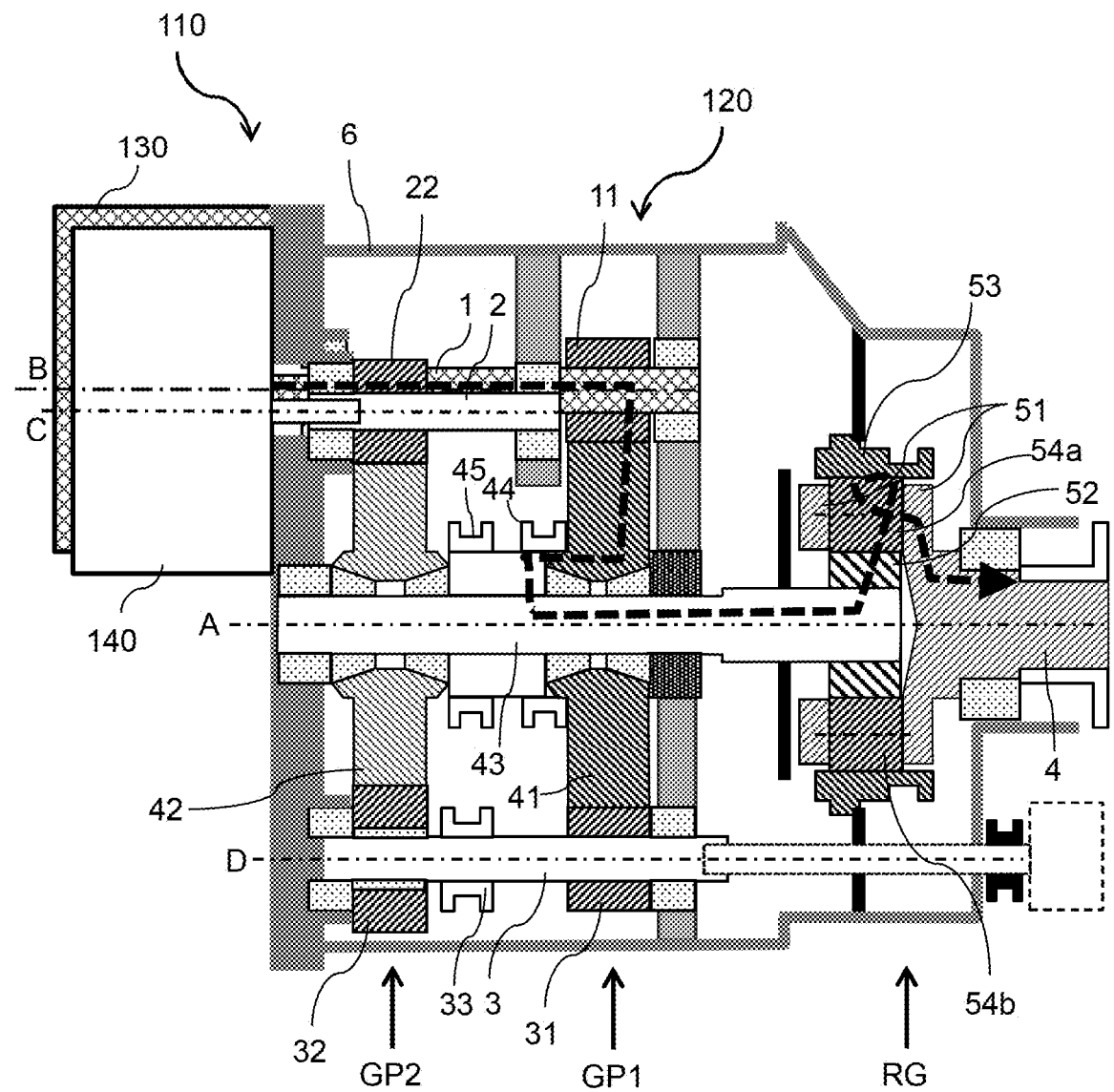
FIG. 4 illustrates power flow through the transmission in FIG. 2 in a second state.

In FIG. 4, the vehicle speed has been increased and the third gear engaging device 33 has been shifted to the disengaged state, allowing the second countershaft gearwheel 32 to rotate with respect to the countershaft 3 and the first countershaft gearwheel 31. The first g ear engaging device 44 remains in its engaged state, and the second gear engaging device 45 remains in its neutral state. In this configuration, no torque is transmittable between the second electric machine 140 and the output shaft 4. Torque generated by the first electric machine 130 is transmitted to the main shaft 43 via the first input shaft gearwheel 11, the main gearwheel 41 and the first gear engaging device 44. From the main shaft 43 to the output shaft 4, torque is transmitted via the low range gear.

Figure 5:
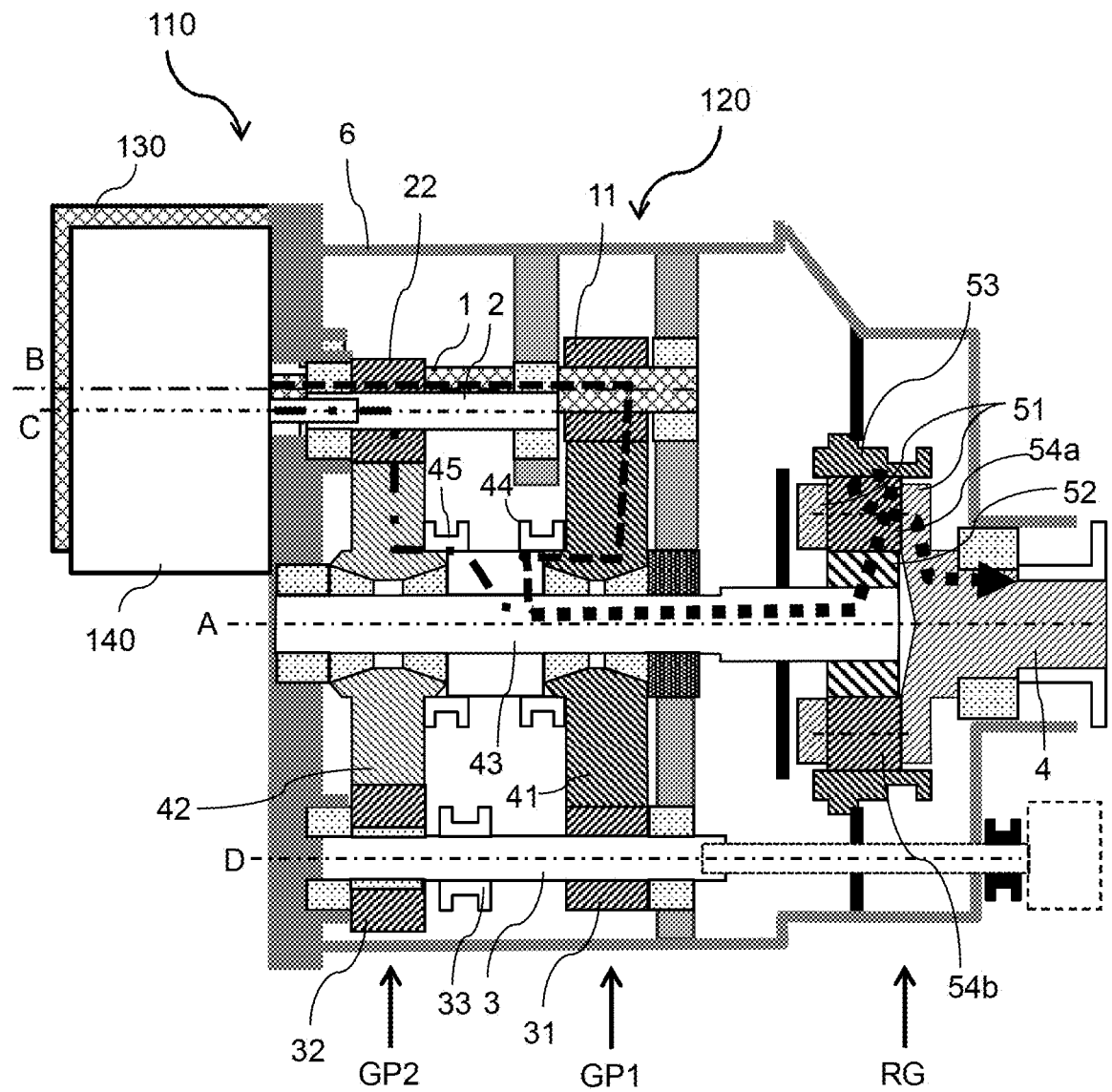
FIG. 5 illustrates power flow through the transmission in FIG. 2 in a third state.

In FIG. 5, the vehicle speed has been further increased and the second electric machine 140 now assists the first electric machine 130 in the propulsion of the vehicle 100. This has been achieved by shifting the second gear engaging device 45 to its engaged state. Thus, both the first and the second gear engaging devices 44, 45 are set to their respective engaged states, while the third gear engaging device 33 remains in its disengaged state. Torque from the first electric machine 130 is transmitted as described with reference to FIG. 4, while torque from the second electric machine 140 is transmitted via the second input shaft gearwheel 22, the second main gearwheel 42 and the second gear engaging device 45 to the main shaft 43. The low range gear is still engaged.

Figure 6:
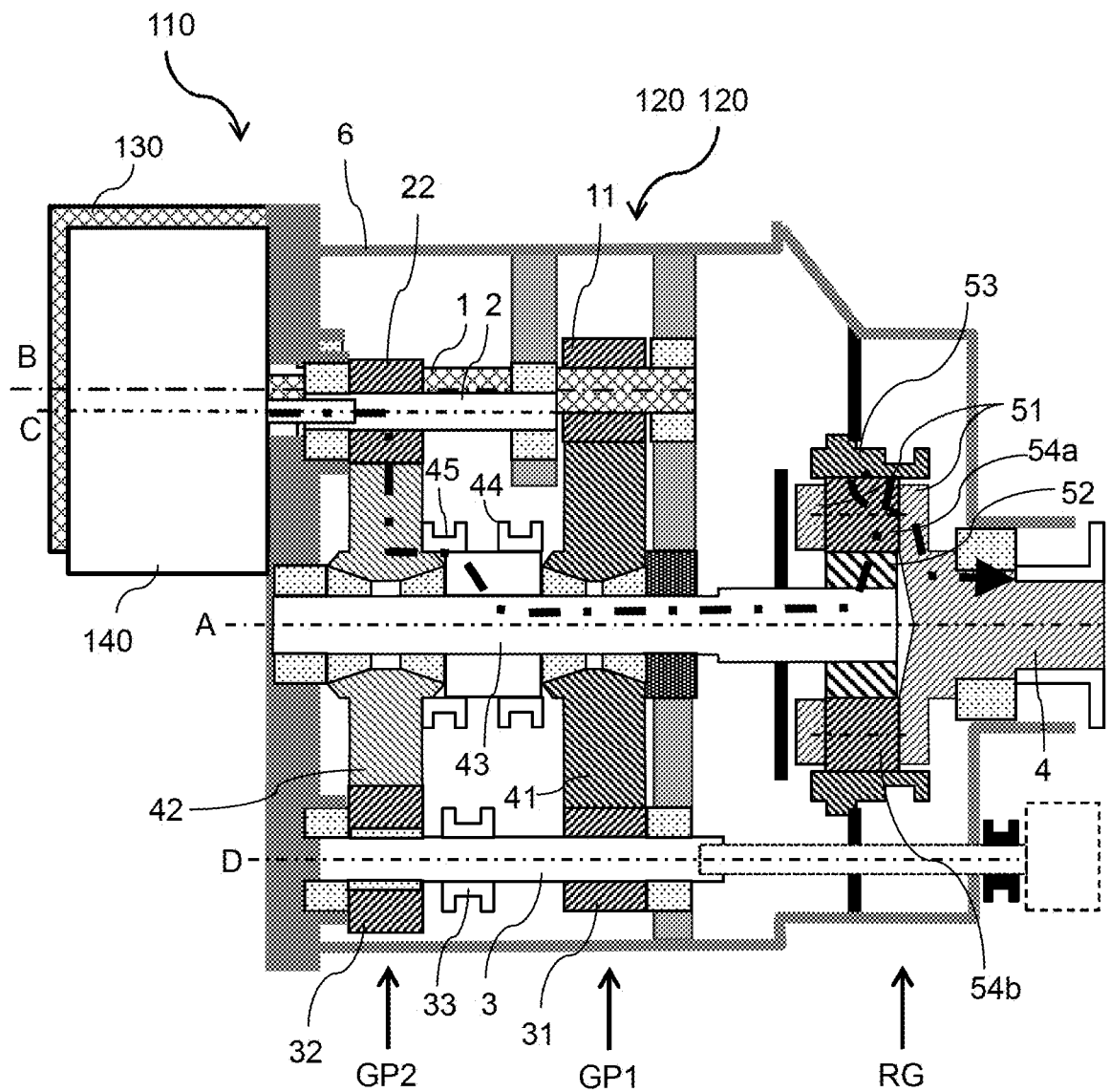
FIG. 6 illustrates power flow through the transmission in FIG. 2 in a fourth state.

In FIG. 6, the vehicle speed has been further increased and the torque transmission from the first electric machine 130 to the main shaft 43 has been temporarily interrupted by setting the first gear engaging device 44 to its neutral state. The third gear engaging device 33 remains in its disengaged state and the second gear engaging device 45 remains in its engaged state. Torque from the second electric machine 140 is transmitted as described with reference to FIG. 5. The low range gear is still engaged.

Figure 7:
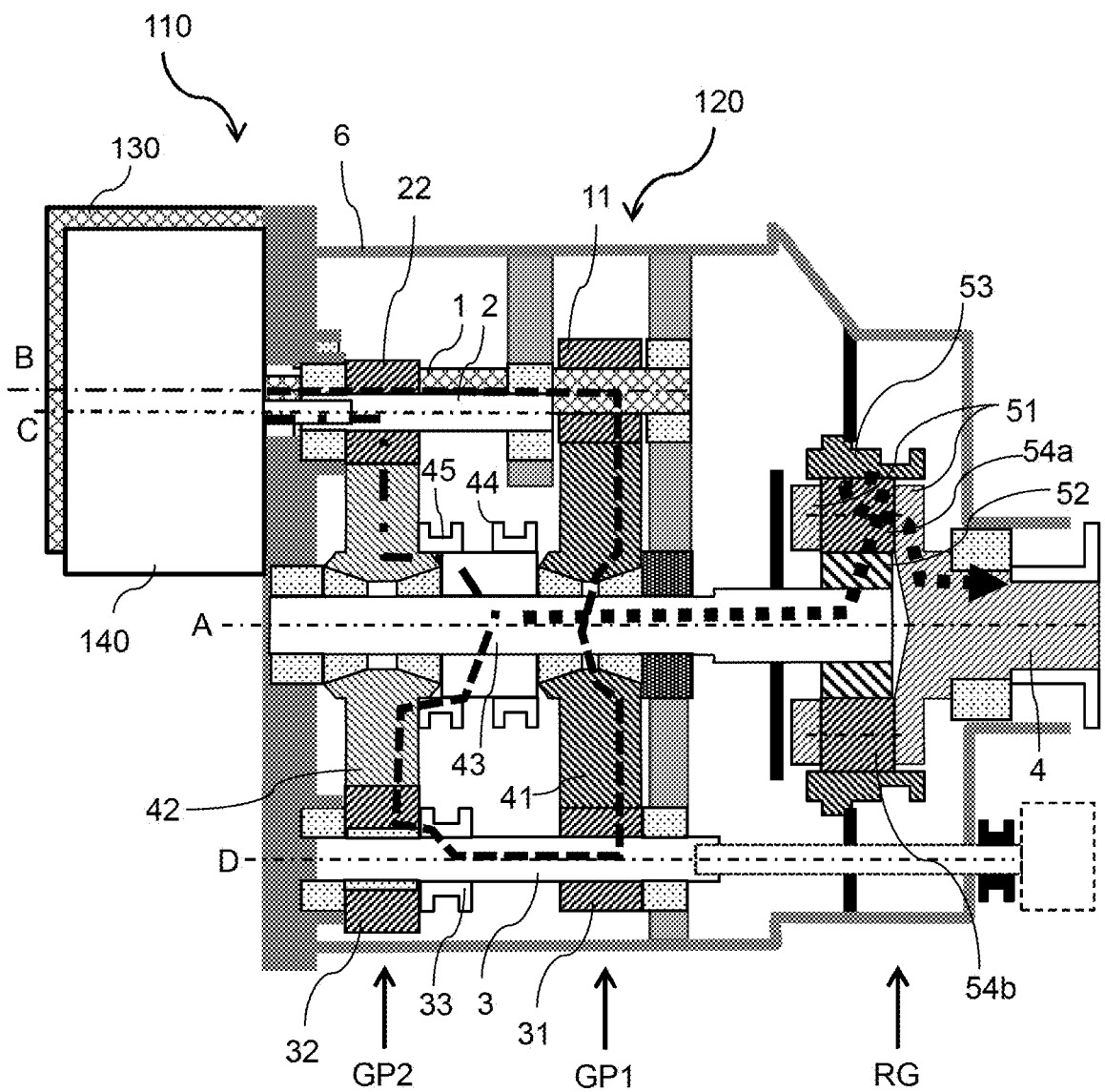
FIG. 7 illustrates power flow through the transmission in FIG. 2 in a fifth state.

In FIG. 7, the vehicle speed has been further increased and the first electric machine 130 again assists the second electric machine 140 in the propulsion of the vehicle 100. This has been achieved by shifting the third gear engaging device 33 to its engaged state while the first gear engaging device 44 remains in its neutral state and the second gear engaging device 45 remains in its engaged state. Thereby, the first electric machine 130 is drivingly connected to the main shaft 43 via the gearwheels 11, 41, 31 of the first gear plane GP1, the countershaft 3, the third gear engaging device 33, the second countershaft gearwheel 32, the second main gearwheel 42, and the second gear engaging device 45. Torque from the second electric machine 140 is transmitted as described with reference to FIG. 5. The low range gear is still engaged.

Figure 8:
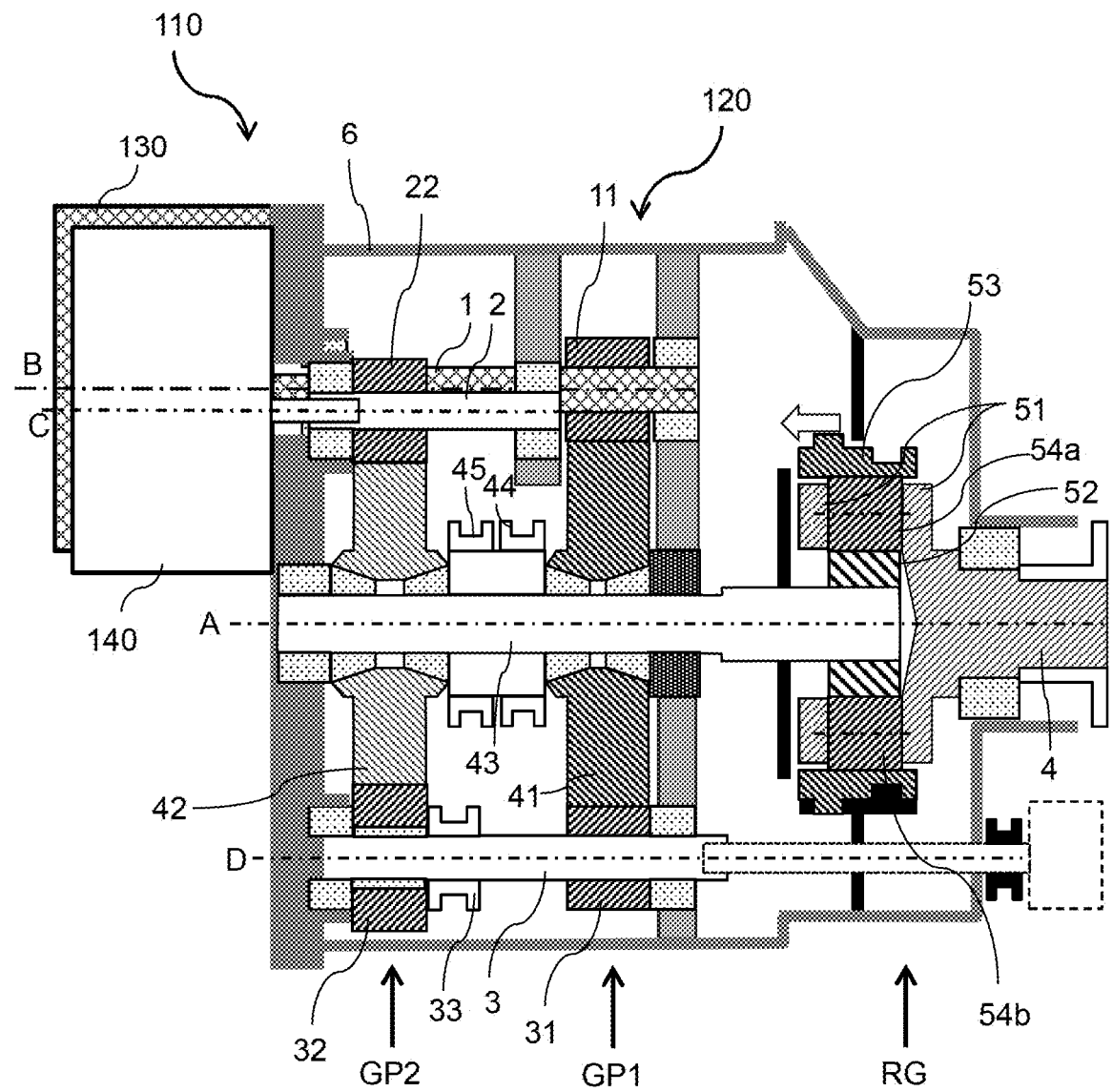
FIG. 8 illustrates range shifting in the transmission in FIG. 2.

FIG. 8 illustrates shifting of the range gear RG from the low range gear to the high range gear, herein achieved by sliding the ring gearwheel 53 along the longitudinal axis A toward the first gear plane GP1 as indicated by the arrow. Both the first and the second gear engaging devices 44, 45 are set to their neutral positions, temporarily interrupting torque transfer from the respective input shafts 1, 2 to the main shaft 43. The third gear engaging device 33 may remain in its engaged state as illustrated in FIG. 8, but it may also be set to its disengaged state.

Figure 9:
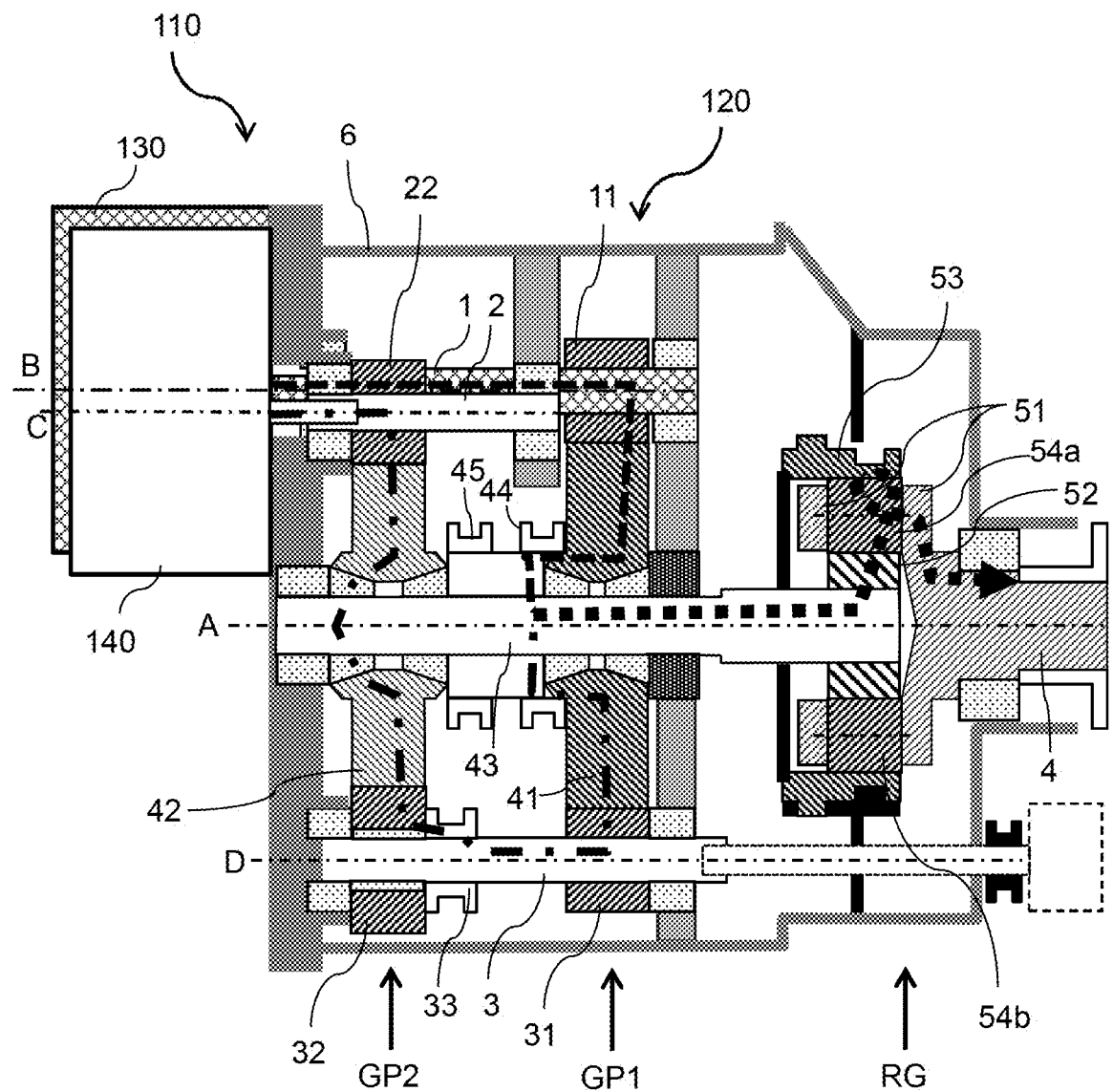
FIG. 9 illustrates power flow through the transmission in FIG. 2 in a sixth state, FIG. 10 schematically illustrates power flow through the transmission in FIG. 2 in a mode of operation, and FIG. 11 schematically illustrates power flow through a transmission according to a second embodiment.

FIG. 9 illustrates the transmission 120 after shifting to the high range gear, i.e., by locking the ring gearwheel 53 to the main shaft 43 and thereby to the sun gearwheel 52. The power flow from the electric machines 130, 140 to the main shaft 43 corresponds to that illustrated in FIG. 3. When the speed is further increased, the shifting sequence of the first and second gear engaging devices 44, 45 and the third gear engaging device 33 as illustrated in FIGS. 4-7 may be repeated, but with the range gear RG set to the high range gear.

Figure 10:
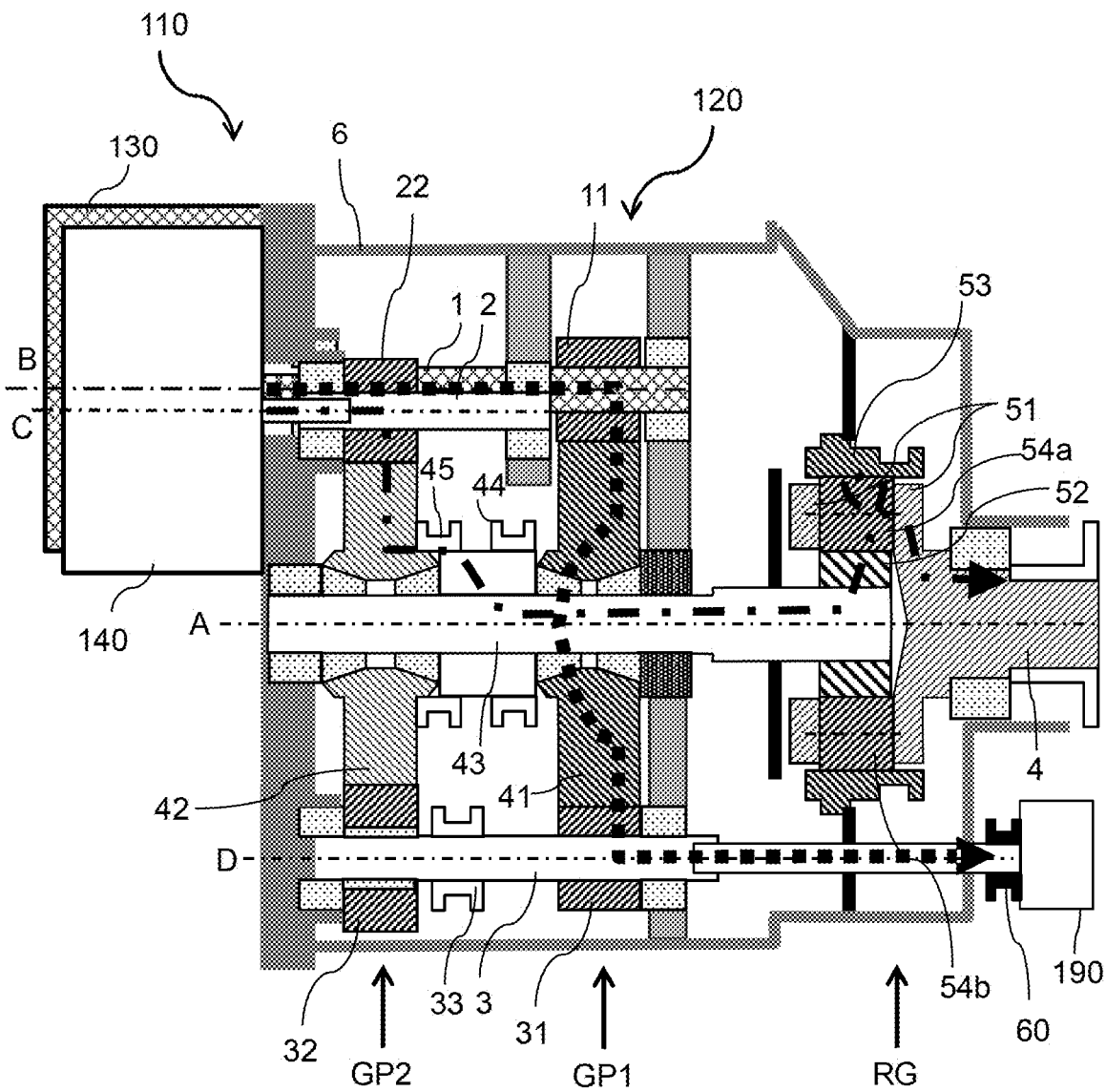

As illustrated in FIG. 10, the transmission 120 may, in a PTO mode of operation, also be used for driving the PTO device 190 using power from the first electric machine 130 while the second electric machine 140 is used for propulsion of the vehicle 100. The range gear RG is herein set to the low range gear, the first gear engaging device 44 is set to the neutral state, the second gear engaging device 45 is set to the engaged state, and the third gear engaging device 33 is disengaged. The clutch 60 engages the PTO device so that it is driven by the countershaft 3, in turn driven by the first electric machine 130 via the gearwheels 11, 41, 31 of the first gear plane GP1. No parts of the powertrain 110 are in this mode of operation drivingly connected to both of the first and second power units 130, 140.

The PTO device 190 is thus driven independently of the vehicle speed.

It is also possible to drive the PTO device 190 independently of the vehicle speed by setting both the first and the second gear engaging devices 44, 45 to their neutral states and by engaging the third gear engaging device 33 and the clutch 60. In this way, none of the power units 130, 140 is used for propulsion of the vehicle 100. Of course, it is also possible to drive the PTO device 190 in other modes of operation in which the countershaft 3 is used for transmitting torque from either one of the electric machines 130, 140 to the output shaft 4, by engaging the clutch 60. In such cases, the PTO device 190 is not driven independently of the vehicle speed.

Figure 11:
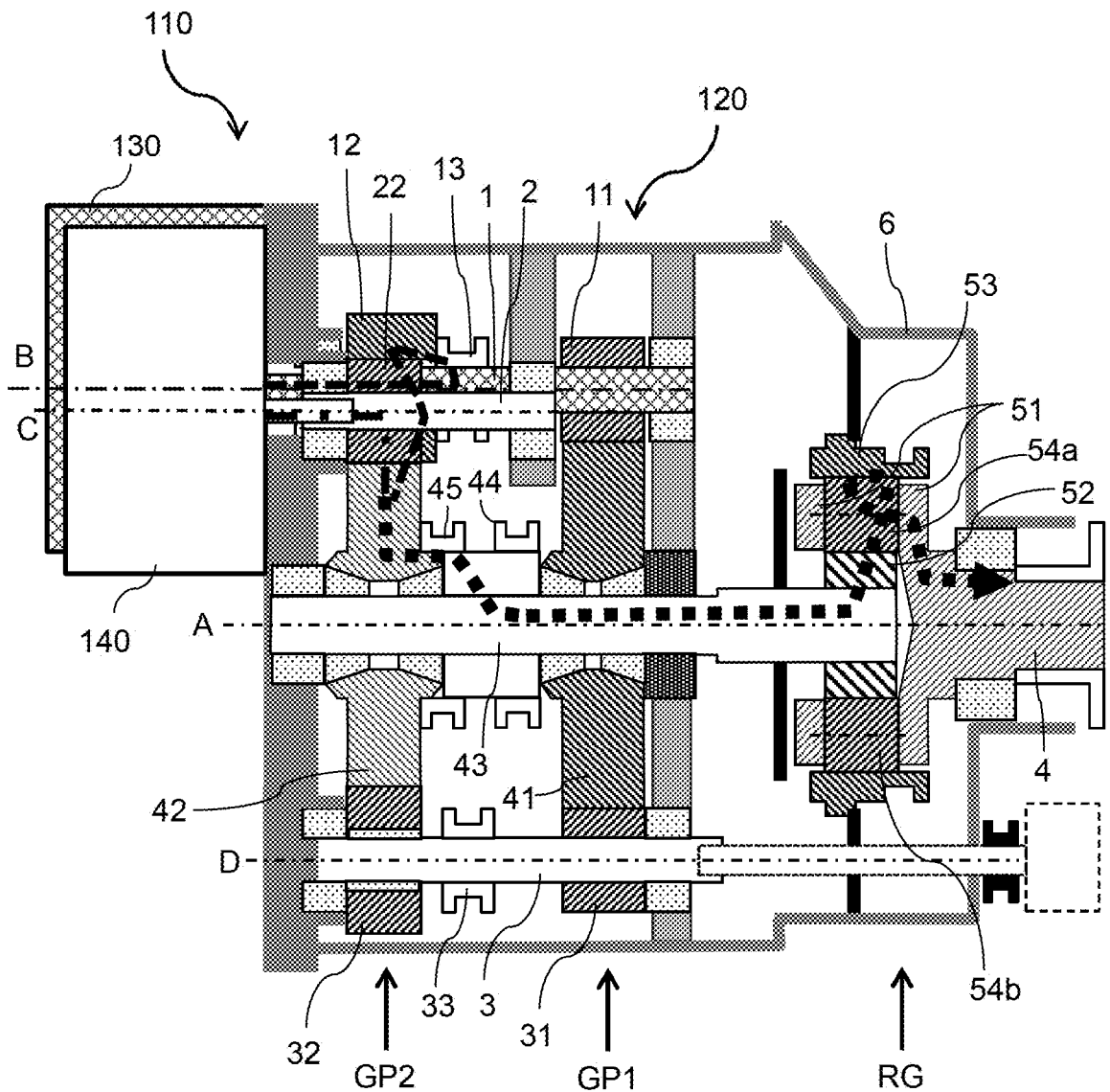

A transmission 120 according to a second embodiment is illustrated in FIG. 11. The transmission 120 only differs from the first embodiment in that it comprises a first input shaft second gearwheel 12 located in the second gear plane GP2, and a fourth gear engaging device 13 comprising a sleeve member. The first input shaft second gearwheel 12 is rotatably arranged on the first input shaft 1 and the fourth gear engaging device 13 is arranged for selectively rotationally connecting the first input shaft second gearwheel 12 to the first input shaft 1 in an engaged state of the fourth gear engaging device 13. The first input shaft second gearwheel 12 is herein arranged in meshing engagement with the second main gearwheel 42. In FIG. 11, torque transfer using this first input shaft second gearwheel 12 is shown when the vehicle 100 is driven at a medium vehicle speed, corresponding to the configuration illustrated in FIG. 7. However, only the second gear plane GP2 is used for torque transfer. The third gear engaging device 33 is disengaged and the first gear engaging device 44 is set to the neutral state, while the second gear engaging device 45 is in its engaged state. Also the fourth gear engaging device 13 is in the engaged state, connecting the first input shaft second gearwheel 12 for common rotation with the first input shaft 1. The engagement of the fourth gear engaging device 13 enables a power flow from the first electric machine 130 to the output shaft 4 via the second gear plane GP2, without using the countershaft 3.

In some embodiments, it is possible to provide a common actuator (not shown) for actuating the third gear engaging device 33 and the fourth gear engaging device 13. In this case, the third gear engaging device 33 may be configured to rotationally connect the second countershaft gearwheel 32 to the countershaft 3 only when the fourth gear engaging device 13 rotationally disconnects the first input shaft second gearwheel 12 from the first input shaft 1, and vice versa. A neutral state in which both the third and the fourth gear engaging devices 33, 13 are set to a disengaged/neutral state may also be available. The common actuator may thus be movable between three different positions.

Although not illustrated in the drawings, a retarder may in all embodiments be connected to the output shaft 4 for further providing an auxiliary brake torque.

A method for controlling the powertrain 110 in the PTO mode of operation, such as illustrated in FIG. 10 for the first embodiment, may comprise the following steps:

S1: Controlling the first gear engaging device 44 to the neutral state, the second gear engaging device 45 to the engaged state, the third gear engaging device 33 to the disengaged state, and the clutch 60 to the engaged state, thereby obtaining the PTO mode of operation of the transmission 120.

S2: Controlling the first power unit 130 to a first rotational speed or torque as requested for driving the power take-off device 190.

S3: Controlling the second power unit 140 to a second rotational speed or torque as requested for driving the propeller shaft 160.

An electronic powertrain control device (not shown) may be provided for controlling the powertrain 110 and for carrying out the method. The powertrain control device may for this purpose comprise means for controlling the first power unit 130, means for controlling the second power unit 140, and means for controlling the transmission 120, including at least the gear engaging devices 44, 45, 33, 13, and the clutch 60. The powertrain control device may be configured to control the power units 130, 140 and the transmission 120 in dependence on a first torque request for driving the propeller shaft 160 and a second torque request for driving the PTO device 190.

The powertrain control device may include a microprocessor, a microcontroller, a programmable digital signal processor or another programmable device. Thus, the powertrain control device comprises electronic circuits and connections (not shown) as well as processing circuitry (not shown) such that the powertrain control device can communicate with different parts of the vehicle 100 or with different control units of the vehicle 100, such as with various sensors, systems and control units, in particular with one or more electronic control units (ECUs) controlling electrical systems or subsystems in the vehicle 100, such as an energy storage system control unit of an electric energy storage system (not shown) of the vehicle 100. The powertrain control device may comprise modules in either hardware or software, or partially in hardware or software, and communicate using known transmission buses such a CAN-bus and/or wireless communication capabilities. The processing circuitry may be a general-purpose processor or a specific processor. The powertrain control device may comprise a non-transitory memory for storing computer program code and data. Thus, the skilled person realizes that the powertrain control device may be embodied by many different constructions. For example, the powertrain control device may be a single unit, or it may be formed of several different control units configured to communicate with each other, such as separate control units for controlling the power units 130, 140 and for controlling the transmission 120.

It is to be understood that the present disclosure is not limited to the embodiments described above and illustrated in the drawings; rather, the skilled person will recognize that many changes and modifications may be made within the scope of the appended claims.

The invention claimed is:

1. A transmission for a vehicle, comprising:
a first input shaft, a second input shaft, a countershaft, a main shaft, and an output shaft,
a first gear plane comprising a first input shaft gearwheel arranged on the first input shaft, a first main gearwheel rotatably arranged on the main shaft, and a first countershaft gearwheel arranged on the countershaft, the gearwheels of the first gear plane being arranged in mutual driving connection,
a second gear plane comprising a second input shaft gearwheel arranged on the second input shaft, a second main gearwheel rotatably arranged on the main shaft, and a second countershaft gearwheel arranged on the countershaft, the first countershaft gearwheel being selectively drivingly connectable to the second countershaft gearwheel, the gearwheels of the second gear plane being arranged in mutual driving connection,
a first gear engaging device selectively settable to one of:
a neutral state, and
a single engaged state, in which it drivingly connects the first main gearwheel to the main shaft,
a second gear engaging device selectively settable to one of:
a neutral state, and
an engaged state, in which it drivingly connects the second main gearwheel to the main shaft,
wherein the output shaft is drivingly connectable to the main shaft, and wherein the transmission is configured to only enable transfer of torque between the first input shaft and the output shaft via the main shaft, and to only enable transfer of torque between the second input shaft and the output shaft via the main shaft,
wherein the second gear plane further comprises a first input shaft second gearwheel rotatably arranged on the first input shaft, and wherein the transmission further comprises a fourth gear engaging device for selectively rotationally connecting the first input shaft second gearwheel to the first input shaft.

2. The transmission according to claim 1, wherein the first main gearwheel is arranged in meshing engagement with each one of the first input shaft gearwheel and the first countershaft gearwheel.

3. The transmission according to claim 1, wherein the second main gearwheel is arranged in meshing engagement with each one of the second input shaft gearwheel and the second countershaft gearwheel.

4. The transmission according to claim 1, wherein the first countershaft gearwheel is permanently fixed for common rotation with the countershaft, and wherein the second countershaft gearwheel is rotatably arranged on the countershaft.

5. The transmission according to claim 4, further comprising a third gear engaging device for selectively rotationally connecting the second countershaft gearwheel to the countershaft.

6. The transmission according to claim 5, wherein the third gear engaging device and the fourth gear engaging device are arranged for common operation by a single actuator.

7. The transmission according to claim 5, wherein the third gear engaging device is configured to rotationally connect the second countershaft gearwheel to the countershaft only when the fourth gear engaging device rotationally disconnects the first input shaft second gearwheel from the first input shaft, and vice versa.

8. The transmission according to claim 1, wherein the first input shaft gearwheel and the first main gearwheel of the first gear plane provide a larger gear ratio than the second input shaft gearwheel and the second main gearwheel of the second gear plane.

9. The transmission according to claim 1, wherein the first input shaft gearwheel is permanently fixed for common rotation with the first input shaft, and wherein the second input shaft gearwheel is permanently fixed for common rotation with the second input shaft.

10. The transmission according to claim 1, further comprising a range gear configured for transfer of torque between the main shaft and the output shaft at a high range gear and a low range gear, respectively.

11. The transmission according to claim 10, wherein the range gear comprises a planetary gear set.

12. A powertrain comprising a first power unit, a second power unit and the transmission according to claim 1, wherein the first input shaft of the transmission is drivingly connected to the first power unit and wherein the second input shaft of the transmission is drivingly connected to the second power unit.

13. A powertrain according to claim 12, wherein at least one of the first power unit and the second power unit is an electric machine.

14. The powertrain according to claim 12, further comprising a power take-off device drivingly connected or connectable to the countershaft.

15. A vehicle comprising the powertrain according to claim 12.

* * * * *